Patented June 30, 1936

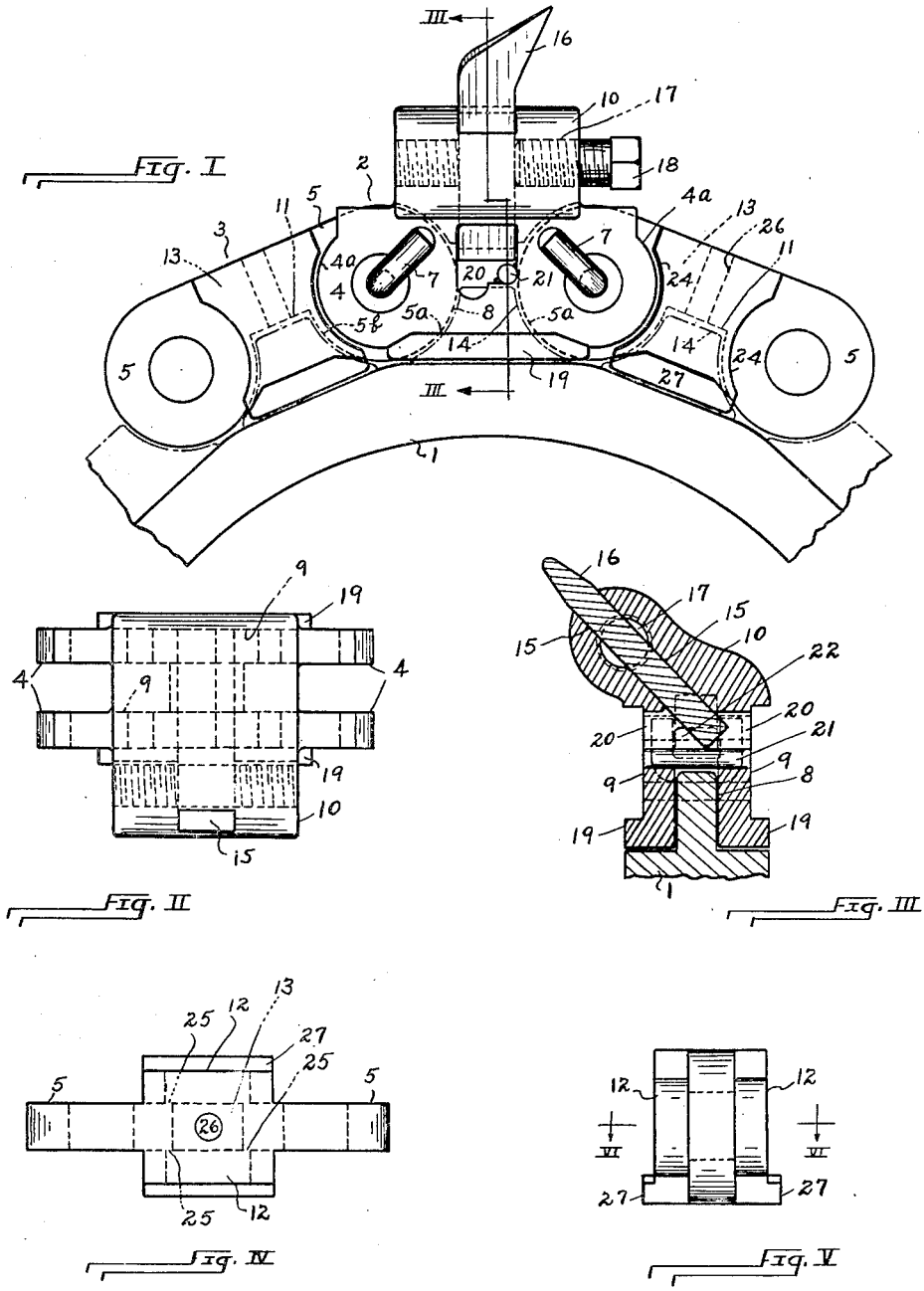

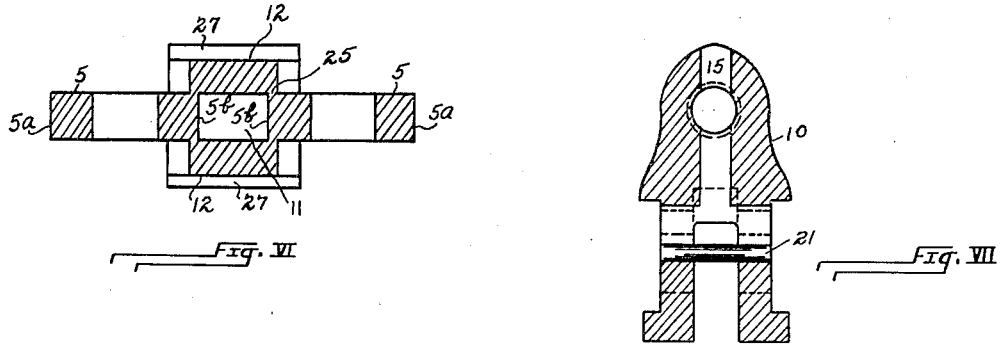
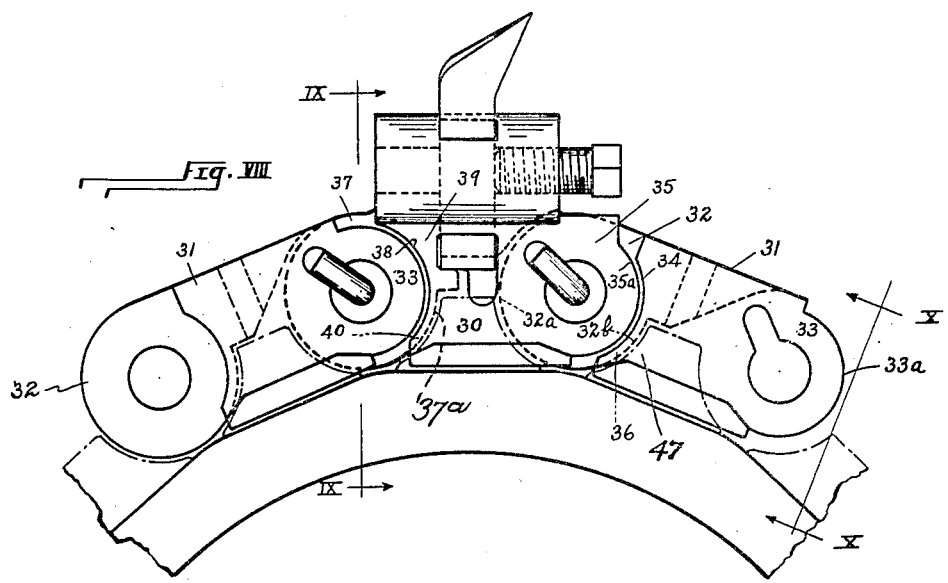
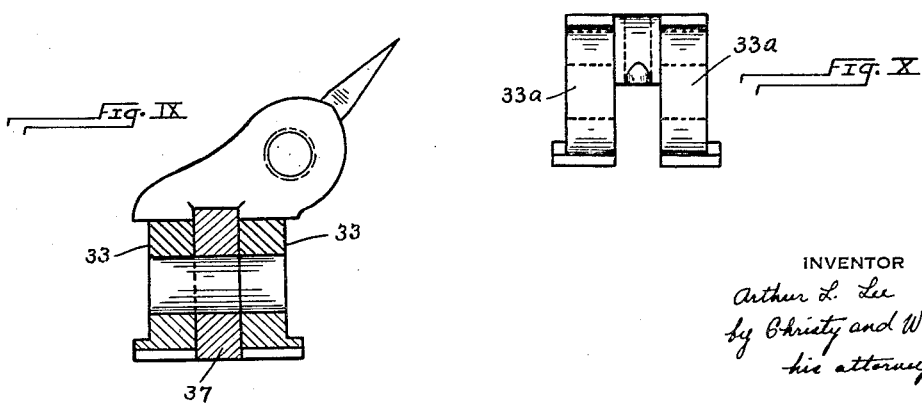

2,046,024

UNITED STATES PATENT OFFICE 2,046,024

CUTTER CHAIN

Arthur L. Lee, Oakmont, Pa.

Application March 30, 1935, Serial No. 13,904

13 Claims. (Cl. 262—33)

This invention relates to a cutter chain for use on coal mining machinery.

There is great advantage, particularly in cutter chains required to perform difficult cutting operations in coal mining, that there should be sprocket tooth engagement in heavy links comprised in the chain. Sprocket tooth engagement in all the links of the chain, including both the bit-carrying links and the connecting links, results in producing a smooth running chain, in which the chain does not tend to sag, or to jump or buckle, away from the cutter bar which carries it. The dimensions of cutter chain links have, however, become standardized, rendering it a difficult matter to provide for the reception of sprocket teeth in both the bit-carrying links and the connecting links, while retaining a sturdy, integral construction of both types of link.

The object of my invention is to provide a smooth running cutter chain of standard dimensions and adequate strength, by cooperatively so forming bit-carrying links and connecting links that a sprocket tooth receiving throat is formed in both the bit-carrying links and in the connecting links, while leaving substantial masses of metal in the said links.

In the accompanying drawings Fig. I is a side elevation, showing a typical fragment of a cutter chain made in accordance with my invention, and a corresponding fragment of a sprocket wheel, illustrating the cooperation between the cutter chain and the sprocket wheel.

Fig. II is a plan view of the bit-carrying link shown in the fragmentary assembly of Fig. I, the cutter pick, or bit, carried by the link being omitted for clearness of illustration.

Fig. III is a vertical section through the bit-carrying link, and the bit carried thereby, taken on the line III—III of Fig. I.

Fig. IV is a plan view of a connecting link as included in the fragmentary assembly of Fig. I.

Fig. V is an end elevation of the connecting link shown in Fig. IV.

Fig. VI is a horizontal section through the connecting link, as shown in Figs. IV and V, taken on the line VI—VI of Fig. V.

Fig. VII is a vertical, sectional view through a bit-carrying link, similar to the showing of Fig. III; this figure of the drawings omits, however, the cutter bit, and is illustrative of one of the central bit-carrying links in the kerf cutting spread of the chain, rather than illustrative of one of the exterior links of the chain, as shown in Fig. III.

Fig. VIII is a side elevation, showing in a manner similar to that in Fig. I a fragment of a cutter chain made in accordance with my invention, and a cooperating fragment of a sprocket wheel, the cutter chain as shown in Fig. VIII being, however, composed of a plurality of hermaphroditic bit-carrying links and connecting links, rather than an association of male connecting links and female bit-carrying links, as shown in Fig. I and the other preceding figures of the drawings.

Fig. IX is a vertical sectional view through a bit-carrying link, and its pivotal connection with an adjacent connecting link, taken on the line IX—IX of Fig. VIII.

Fig. X is an end elevation of one of the connecting links viewed from the position of the line X—X of Fig. VIII.

Referring to Figs. I to VI inclusive of the drawings, reference numeral 1 designates generally a sprocket wheel, arranged to cooperate with a cutter chain composed of bit-carrying links 2 and connecting links 3. Pivotal yoke and eye connection is provided between a link of each type, and the two adjacent links of the other type. As shown in these figures of the drawings, each of the bit-carrying links 2 has at the ends thereof yokes 4, comprising two spaced members arranged to embrace eyes 5 carried terminally by the connecting links.

Yokes 4 are perforated cooperatively with the perforations in the eyes 5, and as shown they are pivotally interconnected by the pin connection disclosed in my co-pending application Serial No. 733,370, filed June 2, 1934, and in the division thereof, Serial No. 14,873, filed April 5, 1935. Such connection, briefly described, comprises a hardened pin passed through matching openings in the yoke and eye, and having in a central bore thereof a heavy wire 7 deflected exteriorly of the yoke to lie terminally in matching grooves in the pin and in the yoke.

It will be noticed the drawings show that both the bit-carrying links and the connecting links are of integral construction. In the bit-carrying link there is a sprocket tooth receiving throat 8, the formation of which will be hereinafter described, which lies between side elements 9 of the link, and which is overlaid by a pick receiving boss 10 bridging between the side elements 9. The connecting link has therein a sprocket tooth receiving throat, or recess, 11, lying between side elements 12 and overlaid by a bridging mass of metal 13. Fig. I shows the extension of a sprocket tooth 14 into the sprocket tooth throat 8 of the bit-carrying link, and into the sprocket tooth receiving throat 11 of the connecting link.

Considering the bit-carrying link independently and specifically, this link consists primarily of the side elements 9, which are spaced from each other throughout their entire length, and the bit-receiving boss 10 which bridges between these side elements to integrate the structure. Bit-carrying boss 10 has therein a bit-receiving bore 15 for receiving a cutter bit, or pick, 16, and a threaded longitudinally extending bore 17 to receive locking screw 18 for the cutter bit. At the lower edges of the side elements 9 of the bit-carrying links are arranged lateral flanges or gibs 19 for engaging gooves in the chain guide forming part of a standard cutter arm.

Upwardly of the gibs 19 the side walls are perforated at 20, to provide for the ejection of particulate foreign material from the link. Transversely arranged at each of these side openings 20 is a bar 21, which separates the sprocket throat from the upper interior portion 22 within the link, in which the butt of the cutter bit extends. The primary function of this transverse bar 21 is to prevent the entry of a broken portion of a cutter bit into the sprocket throat of the bit-carrying link, since such intrusion would tend to unseat the chain from its sprocket, and would tend to injure the sprocket teeth. If desired, this transverse bar 21 may be notched to receive a butt edge of the cutter bit, and thereby give support to the butt of the cutter bit in effective alignment with the cutter bit bore 15.

In each bit-carrying link, the sprocket tooth throat is defined by the arcuate surfaces 5a of the connecting link eyes 5. As pivotally connected with the yokes 4 of the bit-carrying link, the connecting link eyes project between the side members 9 of the bit-carrying link such distance that their surfaces 5a form a throat of suitable size and contour to receive one of the sprocket teeth 14. It may be here noted that the arms of yokes 4, formed at the opposite ends of the bit-carrying link, have thereon outwardly presented edge faces 4a, which are formed on a radius less than that on which the faces 5a of the connecting link eyes are formed.

In each connecting link, the sprocket tooth throat is defined by the side elements 12 of the connecting link, by the bridging mass of metal which overlies the sprocket tooth throat, which interconnects the side elements 12, and by the inwardly presented edge faces 5b of the connecting link eyes. The inwardly presented arcuate faces 5b of the connecting link eyes, are formed on the same radius as that on which are formed the outwardly presented edge faces 5a of the eyes, which provide sprocket tooth bearing surfaces in the bit-carrying links. The sprocket tooth throats are thus uniform throughout the several links of the chain.

The central, or body, portion of each connecting link comprises the side elements 12, the bridging region 13, and, as will be explained, a zone comprised within the conformation of eye 5. At the base of that portion of each of the eyes 5 which is of decreased width, there is a vertically disposed edge face 24, formed in the body region of the connecting link. Throughout an intermediate portion of its height, each of these edge faces 24 is arcuate, and is formed on a radius substantially less than that on which the faces 5a and 5b of the yoke 5 are formed. The arcuate regions in these faces 24 accommodate, and provide in assembly a slight clearance for the arcuate faces on the arms of the yokes 4, which arcuate faces 4a are also formed on a radius less than the edge faces on the eyes 5.

It will be noted that at the base of each eye, in the region of the sprocket tooth throat, there is thus a transverse wall 25 which forms in effect a portion of the eye. This wall is defined by the difference in radius of the eye faces 5a, and the arcuate portion of the region 24 at the base of each eye, or, otherwise expressed, by the difference in radius between the edge faces of the eyes 5 and the edge faces of the yokes 4. This transverse wall 25, formed by the differential radii, serves to integrate the eyes 5 of the connecting link with the central, or body, portion of the connecting link. Since in use of the chain, the greatest stress is encountered at that wall of the sprocket throat which lies forwardly with respect to the direction of travel of the chain, the integration of the eyes with the body of the link in this region, and the apportionment of parts effecting this integration, are of primary importance.

Desirably, each of the connecting links is provided with a bore 26, which extends vertically of the link from the upper surface of the bridging region 13 to the sprocket tooth opening in the link. This opening 26 provides passage for dirt and cuttings in a direction away from the sprocket. Desirably, each connecting link 4 is also provided with laterally extending flanges, or gibs, 27.

Referring to Figs. VIII to X inclusive of the drawings, the cutter chain, and its elements, therein shown, is identical in principle with the cutter chain structure shown in the preceding figures of the drawings. In this modified form of chain, however, both the bit-carrying links 30 and the connecting links 31 are hermaphrodite links, each being formed to provide an eye at one terminal and a yoke at its opposite terminal. Otherwise the structure of each of the links is closely similar to the structure of the links shown in Figs. I to VII inclusive.

Considering first the forward one of the connecting links 31, shown to the right in Fig. VIII, this link carries an eye 32 at its rearward terminal, and a yoke 33 at its forward terminal. As will be seen, the arcuate region in each of the vertically disposed yoke-accommodating faces 34 is formed on a lesser radius than the outwardly presented edge face 32a of the eye, and the inwardly presented face 32b of the eye. The lesser radius of faces 34 is adequate to accommodate a yoke 35 on the next succeeding bit-carrying link which is identical with the yoke 33 on the connecting link shown, and has, therefore, edge faces formed on a radius less than the radii on which the edge faces 32a and 32b of the eye are formed. This difference in radii leaves at the base of the eye a transverse wall 36, which extends the full width of the body region 47 of the connecting link, and thereby integrates the eye with the side elements of the body region.

The yoke 33 at the forward terminal of the connecting link 31 which follows the bit-carrying link 30, is formed to present edge faces 33a which are formed on a radius less than that on which the faces of the eye 32 are formed, and on a radius equal to that on which the edge faces 35a of the yoke 35 are formed. This yoke 33 embraces an eye 37 at the rearward extremity of the bit-carrying link 30, which is identical in the presentation of inward and outward faces to eyes 32 of the connecting links. The rearward face of the sprocket throat in bit-carrying link 30 is, therefore, provided by the inwardly presented edge face 37a of this eye. Also, arcuate faces 38, formed in the side elements 39 of the bit-carrying link, are formed on a lesser radius than that upon which the edge face 37a of the bit-carrying eye 37 is formed. Similarly, this leaves in the bit-carrying link at the base of the eye 37 thereof, a transverse wall 40, integrating the eye 37 with the side elements 39. The presence of this wall 40 is similarly due to difference in radius between the edge faces 33a of yoke 33, and the edge face 37a of eye 37.

It should be understood that, if desired, a bit-carrying link may be provided at both terminals with eyes, and the connecting link may be provided at both terminals with yokes. Such structure is somewhat less advantageous, however, for the reason that it would necessitate shortening the gibs of the bit-carrying links. If both eyes be carried by the bit-carrying links, it is possible, though not preferred structure, to form the connecting link of two separate strap elements joined by their pinned connection to the eyes of the bit-carrying links. In such case, of course, the effect of the differential radii, in obtaining an integrating wall at the base of each eye becomes applicable wholly to the bit-carrying links.

It may be noted that, in providing a sprocket throat in each chain link, of both types, I have avoided difficulty in providing clearance within the bit-carrying links between the sprocket teeth and the butt of the cutter bit. This is for the reason that I have appreciated the fact that I need not employ a sprocket having a standard length of tooth thereon. Since I project a sprocket tooth into every link of the chain, rather than every alternate link of the chain, the use of short sprocket teeth provides at any one time adequate body of sprocket tooth metal within the chain, and adequate area of sprocket tooth bearing within the chain. In fact, additionally to providing a smooth running chain, my invention also serves to reduce wear upon, and breakage of, sprocket teeth.

It should be noted that my construction provides a short-coupled chain, in which the pitch line between sprocket tooth centers is rendered unusually short. This is effected in my construction by receiving an increased number of sprocket teeth into the chain at any one time, without extending the length of the chain links beyond standard dimensions.

Since the total effective sprocket tooth area within the chain is, as above explained, increased substantially by increasing the number of teeth effective, a proportion of such possible area may, if desired, be resolved into side wall thickness of the links. Maintaining standard overall link width, the side wall thickness may be increased, without disadvantageously subtracting from the total effective area of contact between the sprocket teeth and the connecting links.

I claim as my invention:

1. In a cutter chain comprising bit-carrying links and connecting links alternately arranged and having yoke and eye connection therebetween; a combined structure of integral bit-carrying links and integral connecting links both types of link having a sprocket tooth receiving recess extending upwardly from the bottom thereof, and curved surfaces of equal radius forming forward and rearward edges on each eye to provide in the sprocket tooth recess of each link sprocket tooth bearing, the yokes embracing the eyes of the chain having their edge faces formed on a shorter radius than that on which the edge faces of the eyes are formed, thereby diminishing at the base of each eye deletion of metal necessary to give clearance within the width of the link for the legs of the yoke embracing the eye.

2. In a cutter chain comprising bit-carrying links and connecting links alternately arranged and having pivotal yoke and eye connection therebetween; a combined structure of integral bit-carrying links and integral connecting links, both types of link having a sprocket tooth receiving recess extending upwardly from the bottom thereof, curved surfaces of equal radius forming forward and rearward edges on each eye to provide in the sprocket tooth recess of each link sprocket tooth bearing, the yokes for embracing the eyes of the chain having their edge surfaces formed on a shorter radius than that on which the edge faces of the eyes are formed, and a zone at the base of each eye defined by the difference in radius between edge surfaces of yoke and eye integrating the eye with side walls of the link defined by the sprocket tooth recess therein.

3. In a cutter chain comprising bit-carrying links and connecting links alternately arranged and having pivotal yoke and eye connection therebetween; a combined structure of bit-carrying links, and integral connecting links, both types of link having a sprocket tooth receiving recess extending upwardly from the bottom thereof, each connecting link having at each end thereof an eye with a yoke-engaging region of lesser width than the width of the link body and presenting both outwardly and in the sprocket tooth recess of the link curved edge surfaces of equal radius, whereby in assembly of the chain the eyes of the connecting links provide sprocket tooth bearing surfaces in the recesses both of the bit-carrying links and the connecting links; yokes at each end of each bit-carrying link for embracing the eyes of the connecting links and having their edge surfaces formed on a shorter radius than that on which the connecting link eyes are formed, and a zone at the base of each connecting link eye defined by the difference in radius between the edge surfaces of yoke and eye integrating the eye with side walls of the connecting link defined by the sprocket tooth recess therein.

4. In a cutter chain comprising bit-carrying links and connecting links alternately arranged and having pivotal yoke and eye connection therebetween; a combined structure of integral bit-carrying links and integral connecting links, both types of link having a sprocket tooth receiving recess extending upwardly from the bottom thereof, each link of both types having on one end thereof an eye of a width less than the full width of the link and on the other end thereof a yoke arranged to embrace the eye of an adjacent link; each eye being formed to present inwardly of the sprocket tooth recess of the link a curved edge surface giving sprocket tooth bearing therein and to present outwardly thereof a curved edge surface defining the sprocket tooth recess in an adjacent link, said curved edge surfaces being of equal radius, curved edge surfaces on the yoke of each link formed on a lesser radius than that on which the edge surfaces of the eye are formed; and a zone at the base of each eye defined by the difference in radius between the eye and its associated yoke integrating the eye with side walls of the link defined by the sprocket tooth recess therein.

5. In a cutter chain comprising bit-carrying links and connecting links alternately arranged and having pivotal yoke and eye connection therebetween; a combined structure of integral bit-carrying links and integral connecting links, both types of link having a sprocket tooth recess extending upwardly from the bottom thereof, a bridging mass of metal overlying the sprocket tooth recess in both the bit-carrying link and in the connecting link, each link of both types having at one end thereof an eye of a width less than the full width of the link and at the other end thereof a yoke arranged to embrace the eye of an adjacent link; each eye being formed to present inwardly of the sprocket tooth recess of the link a curved edge surface giving sprocket tooth bearing therein and to present outwardly thereof a curved edge surface defining the sprocket tooth recess in an adjacent link, said curved edge surfaces being of equal radius.

6. In a cutter chain comprising bit-carrying links and connecting links alternately arranged and having pivotal yoke and eye connection therebetween; a combined structure of integral bit-carrying links and integral connecting links, both types of link having a sprocket tooth receiving recess extending upwardly from the bottom thereof, each connecting link having at each end thereof an eye with a yoke-engaging region of lesser width than the width of the link body and presenting both outwardly and in the sprocket tooth recess of the link curved edge surfaces of equal radius, whereby in assembly of the chain the eyes of the connecting links provide sprocket tooth bearings in the recesses both of the bit-carrying links and the connecting links; and yokes at each end of each bit-carrying link for embracing each an eye on two adjacent connecting links, the yokes for embracing the eyes having their edge surfaces formed on a shorter radius than that on which the edge faces of the eyes are formed, thereby diminishing at the base of each eye deletion of metal necessary to provide space within the width of the connecting link for the legs of the yoke embracing the eye.

7. In a cutter chain comprising bit-carrying links and connecting links alternately arranged and having pivotal yoke and eye connection therebetween; a combined structure of integral bit-carrying links and integral connecting links, both types of link having a sprocket tooth receiving recess extending upwardly from the bottom thereof, each link of both types having at one end thereof an eye of a width less than the full width of the link and at the other end thereof a yoke arranged to embrace the eye of an adjacent link; each eye being formed to present inwardly of the sprocket tooth recess of the link a curved edge surface giving sprocket tooth bearing therein and to present outwardly thereof a curved surface defining the sprocket tooth recess in an adjacent link, said curved edge surfaces being of equal radius; the legs of the said yokes having curved edge surfaces formed on a lesser radius than that on which the edge surfaces of the eyes are formed, thereby diminishing at the base of each eye deletion of metal necessary to provide space within the width of the link for the legs of the yoke embracing the eye.

8. In a cutter chain comprising bit-carrying links and connecting links alternately arranged and having pivotal yoke and eye connection therebetween; a combined structure of integral bit-carrying links and connecting links, both such types of link being adapted to receive a sprocket tooth thereinto, the connecting eyes of said chain being of lesser width than the full body width of the link of which they form part and having both inwardly and outwardly presented curved edge surfaces of equal radius providing in the chain sprocket tooth bearing, the yoke elements presenting curved edge surfaces formed on a radius shorter than that on which the edge surfaces of the eyes are formed, and a zone at the base of each eye defined by the difference in radius between the edge face of the eye and the edge face of its associated yoke elements integrating the eye transversely with the body of the link which carries the eye.

9. In a cutter chain comprising bit-carrying links and connecting links alternately arranged and having pivotal yoke and eye connection therebetween; a combined structure comprising an integral bit-carrying link having an eye at one end at least of said link, and a connecting link constructed to provide yoke elements for embracing said eye, both of said links being adapted to receive a sprocket tooth thereinto, the connecting eye of said chain being of lesser width than the width of the link which carries it, said eye presenting both outwardly and inwardly of the link curved surfaces of equal radius providing in the chain sprocket tooth bearing, the yoke elements presenting curved edge surfaces formed on a radius shorter than that on which the edge surfaces of the eye are formed, and a zone at the base of the said eye defined by the difference in radius between the edge face of the eye and the edge face of its associated yoke elements integrating the eye transversely with the body of the link which carries the eye.

10. In a cutter chain comprising bit-carrying links and connecting links alternately arranged and having pivotal yoke and eye connection therebetween; a combined structure of bit-carrying links and connecting links, both such types of link being adapted to receive a sprocket tooth thereinto, the connecting eyes of said chain being of lesser width than the full body width of the link of which they form part and having both inwardly and outwardly presented curved edge surfaces of equal radius providing in the chain sprocket tooth bearing, the yoke elements presenting curved edge surfaces formed on a radius shorter than that on which the edge surfaces of the eyes are formed, thereby diminishing at the base of each eye deletion of metal necessary to give clearance within the width of the link for the legs of the yoke embracing the eye.

11. In a cutter chain comprising bit-carrying links and connecting links alternately arranged and having pivotal yoke and eye connection therebetween; a combined structure comprising a bit-carrying link having an eye at one end at least of said link, and a connecting link constructed to provide yoke elements for embracing said eye, both of said links being adapted to receive a sprocket tooth thereinto, the said connecting eye being of lesser width than the width of the link which carries it, said eye presenting both outwardly and inwardly of the link curved surfaces of equal radius providing in the chain sprocket tooth bearing, the yoke elements presenting curved edge surfaces formed on a radius shorter than that on which the edge surfaces of the eye are formed, thereby diminishing at the base of each eye deletion of metal necessary to give clearance within the width of the link for the legs of the yoke embracing the eye.

12. In a cutter chain constructed for propulsion in one direction and comprising bit-carrying links and connecting links alternately arranged and having pivotal yoke and eye connection therebetween; a combined structure of bit-carrying links and connecting links, both such types of link being adapted to receive a sprocket tooth thereinto, the connecting eyes of said chain being of lesser width than the full body width of the links of which they form part and having both inwardly and outwardly presented edge surfaces, the said edge surfaces presented counter to the direction of chain travel for the direct exertion of driving force by the sprocket teeth thereon being curved surfaces of equal radius and the exterior surfaces presented by the yoke elements being formed on a shorter radius, the said shorter radius of the yoke elements diminishing at the base of each eye deletion of metal necessary to give clearance within the link for the legs of the yoke embracing the eye.

13. In a cutter chain constructed for propulsion in one direction and comprising bit-carrying links and connecting links alternately arranged and having pivotal yoke and eye connection therebetween; a combined structure comprising bit-carrying links each having an eye at one end at least of the link, connecting links terminally cooperative with the bit-carrying links and providing each at one end at least thereof yoke elements for embracing the eye of a bit-carrying link, both such types of link being adapted to receive a sprocket tooth thereinto, the eyes throughout the chain being of lesser width than the full body of the links of which they form part and having both inwardly and outwardly presented edge surfaces, the said edge surfaces presented counter to the direction of chain travel for the direct exertion of driving force by the sprocket teeth thereon being curved surfaces of equal radius and the exterior surfaces presented by the yoke elements being formed on a shorter radius, the said shorter radius of the yoke elements diminishing at the base of each eye deletion of metal necessary to give clearance within the link for the legs of the yoke embracing the eye.

ARTHUR L. LEE.